No. 712,545. Patented Nov. 4, 1902.
J. A. JUST.
PROCESS OF PRESERVING MILK IN DRY FORM.
(No Model.)
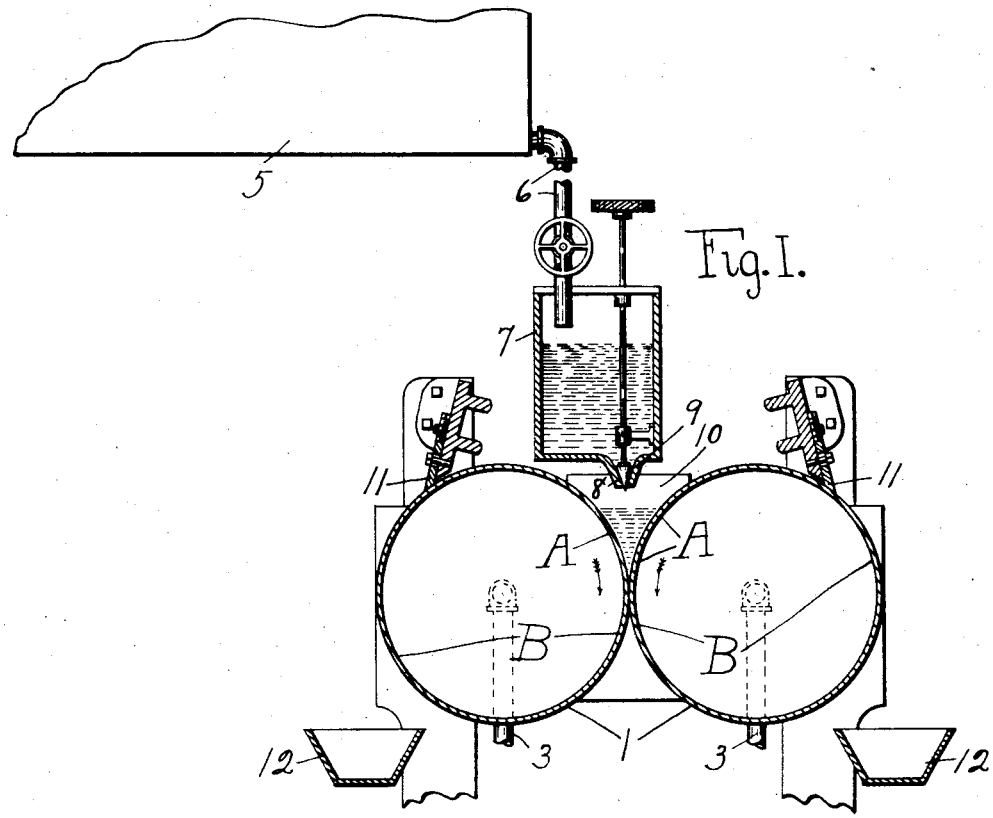
Fig. I.
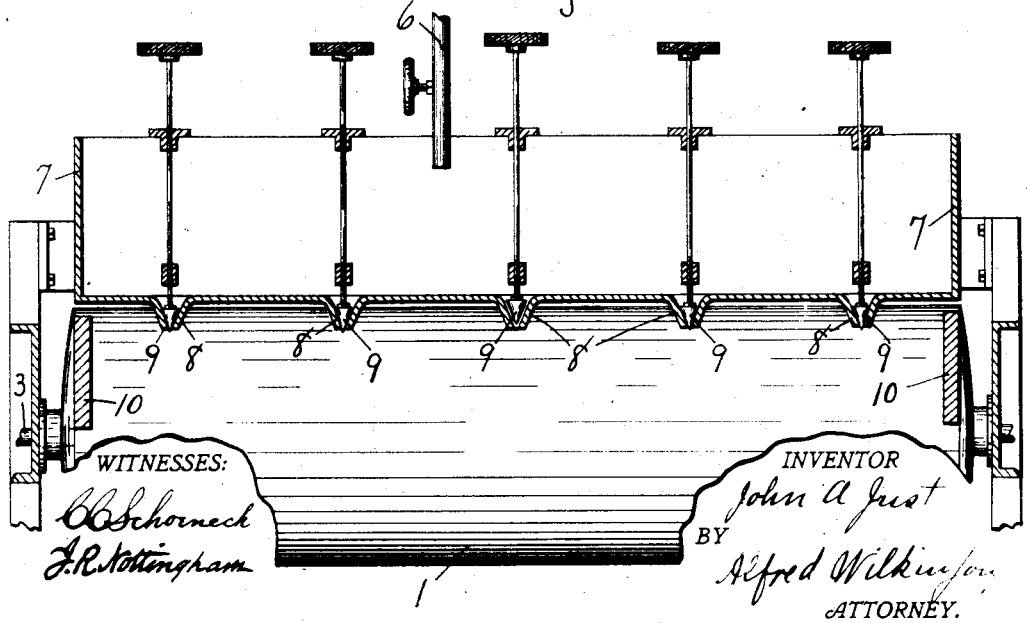
Fig. II.
WITNESSES:
INVENTOR
John A. Just
BY
Alfred Wilkinson
ATTORNEY.

UNITED STATES PATENT OFFICE.

JOHN A. JUST, OF SYRACUSE, NEW YORK.

PROCESS OF PRESERVING MILK IN DRY FORM.

SPECIFICATION forming part of Letters Patent No. 712,545, dated November 4, 1902.

Application filed May 23, 1902. Serial No. 108,614. (No specimens.)

*To all whom it may concern:*

Be it known that I, JOHN A. JUST, a citizen of the United States, residing at Syracuse, in the county of Onondaga and State of New York, have invented a certain new and useful Process of Preserving Milk and Milk-Like Products in a Dry Form; and I do hereby declare the following to be a full, clear, and exact description of the invention, such as will enable others skilled in the art to which it appertains to practice the same.

My invention relates to the preserving of milk and milk-like products in a dry form by expelling the water and maintaining the other ingredients normal and unchanged, so that by the addition of water to the dry product complete milk is reproduced.

The essential steps of my process are delivering the milk in a limited bulk onto a surface heated to a high temperature of from 212° to 270° Fahrenheit, so that it boils violently without separation of the casein, and then drawing this milk in a film onto a heated surface, from which the film is instantly removed when apparently still moist and somewhat tenacious. The sheets, which come off when cool readily crumble and can be powdered, giving a good quality of dry preserved milk. To make a superior product, I prefer, initially, in case of skim-milk to cut off the excessive acidity to about neutral or a shade on the acid side and in case of whole milk to a shade on the alkaline side by the addition of lime or a soluble lime salt. In case of whole milk I also add alkaline hypochlorite to take care of the volatile fatty acids and to prevent future rancidity of the product.

To understand the effect of the different steps of this process, the normal ingredients of milk must be considered and the injurious effects on them produced by ordinary modes of treatment heretofore practiced, which I have guarded against.

Milk consists on the average of the following constituents in substantially the following percentages, there being at least 12.5 per cent. of these solids in whole milk: milk albuminoids, 3.5; milk-fat, 3.5; milk-sugar, 4.6; salts or inorganic substances besides the water, .7 to .9. The albuminoids consist principally of casein in the form of calcic caseinate, evidently a dicalcic caseinate. The remainder of the albuminoids are principally lacto-albumin and lacto-globulin. The latter is so small in amount as to be disregarded. The former is present in the milk in perfect solution. The particles of the casein are held in the solution in a highly "swelled" condition, which gives to the milk the appearance of a solution. This condition and the maintaining a balance of the constituents requires the normality of the milk salts. On heating the milk the calcium citrate present in milk as a natural constituent tends to precipitate. The tricalcic phosphate, which the calcium citrate holds in balance to the casein, changes its position, and the casein at once assumes an insoluble form. Milk contains salts of the following average percentage: sodium chlorid, 10.62 per cent.; potassium chlorid, 9.16 per cent.; monopotassium phosphate, 12.77 per cent.; dipotassium phosphate, 9.22 per cent.; potassium citrate, 5.47 per cent.; dimagnesium phosphate, 3.71 per cent.; magnesium citrate, 4.05 per cent.; dicalcium phosphate, 7.42 per cent.; tricalcium phosphate, 8.90 per cent.; calcium citrate, 23.55 per cent.; calcium oxid in combination with casein, 5.13 per cent.; total, 100.

Where milk is boiled, as heretofore proposed, in the air, a skin is formed on the surface. On removing the skin thus formed a new skin forms. This may continue until fifty or more skins are removed, and thus all the albumin and casein are rendered more or less insoluble and removed in this coagulated form, by which the important swelling property of the casein is entirely destroyed and the solubility of the milk-sugar is partially or wholly lost. Even evaporation of milk in a partial vacuum has a similar action on the albuminoids of milk under certain conditions. For this reason all previous attempts were not successful in drying milk, either in partial vacuo or in the atmosphere, to produce a satisfactory dry milk-powder, one that can be restored to milk on addition of water with the milk constituents intact.

Milk-fat is the most complicated fat known, consisting of from nine to twelve glycerides, or about ninety-one per cent. of fixed fats, and at least four volatile fatty acids, to the amount of nine per cent. To hold the milk-fats in emulsion, a slight alkalinity is necessary.

I have discovered a mode of adjustment which overcomes the former difficulties that arose in the attempt to reduce milk to the dry state and have produced a stable dry product in which the milk constitutents are preserved in their normal condition. This process will be best understood by remembering that the ingredients of milk which most readily induce a change in the attempt to dry the milk are the inorganic substances and the milk-sugar. For instance, by the initial acidity arising from milk-sugar (lactic acid) the balance of the salts is overcome and insoluble casein compounds are separated, (spontaneous souring of milk.) I first neutralize the necessary acidity of the milk or milk-like liquids, so that the milk still reacts slightly on the acid side. This can be done satisfactorily by a solution of calcium oxid ($CaO$) in calcium chlorid, ($CaCl_2$,) representing an excellent form of soluble lime salts with available $CaO$. (At 60° centigrade a solution of $CaCl_2$ specific gravity 1.138 dissolves 6.37 per cent. of $CaO$.) But I find the use of the double salt of sodium and calcium citrate, a salt natural to milk and present therein in its normal state, very desirable and advantageous. The function of calcium citrate in milk is to keep the tricalcium phosphate in solution, and thus maintain the normal casein compound intact. This function must be retained, so that after drying and redissolving the dried product the finely-subdivided casein particles again assume their swelled condition, showing the true nature of the dicalcic caseinate fully preserved, as it originally existed in milk before drying. This sodium calcium citrate does not precipitate on heating, and therefore holds up the tricalcic phosphate and the casein, taking the place of the natural calcium citrate, which does precipitate. In order successfully to preserve the milk-fat and to take care of the unsaturated oleic acid and volatile fatty acids and prevent rancidity, the volatile fatty acids should be fixed and the oleic acid saturated with a suitable substance. I find that an alkaline hypochlorite answers best for this purpose, the amount required being exceedingly small, but should be equivalent to the amount of volatile fatty acids present. These reagents—that is, the calcic chlorid containing calcic oxid in solution or the double salt of sodium and calcium citrate, or both, and the alkaline hypochlorite—may be mixed with the milk by any desirable means; but as this is not an easy matter so to incorporate them they may be mixed mechanically by first adding the reagents to a limited quantity of milk, mixing it therein by hand, and then delivering this mixture to the bulk of milk to be treated, which has been previously weighed and is contained in a store-tank in order to fix the requisite amounts of reagents in proportion to the initial acidity as the varying condition of the milk may demand. The mass is then mixed mechanically and forced from the tank through an ejector by steam or air pressure or in any suitable way in order to give a thorough diffusion of these reagents throughout the entire mass. It will be noticed that the introduction of these reagents introduces nothing foreign into the product. The quantity of the reagents required to maintain and insure a normal balance and equilibrium of the milk constituents when reduced to a dry form is small, and on adding water milk is again restored. From the tank the milk treated with the reagents or adjusted milk is continuously conducted and delivered to a suitable retaining-surface heated comparatively to a high degree, at least 212° Fahrenheit, and preferably somewhat higher, but not to exceed 270° Fahrenheit as a maximum. The milk upon being brought into contact with the heated surface boils up violently, supported and dancing continuously, as it were, on a steam cushion between the hot metal and the body of the milk without forming any sign of skin on the surface, thus preserving the casein fully in its normal condition through this stage. From this heated surface, which I call the "retainer," the milk or milk-like solution is drawn in a film onto a similarly-heated surface, from which the film is instantly scraped or removed while apparently still moist and somewhat tenacious, coming off in sheets, which on cooling crumble readily and can be powdered. The dried milk is sterilized by the process.

By this process and new mode of heating and adjusting the condition of the salts of milk the salts are maintained in balance and in equilibrium, so that the normal and important "swelling up quality" of the dicalcic caseinate (as casein is supposed to exist in normal milk) is preserved unchanged. This apparently damp condition of the film while hot is due to the retention of a portion of the water of crystallization by the milk-sugar, to which it clings tenaciously and disappears instantly on cooling of the removed film, which is then, as aforesaid, easily reduced to powder. The retention of this portion of water prevents any change in the milk-sugar. The development of bitter and burnt taste and change in color is avoided, and this delicate ingredient is dried at a high temperature.

In the drawings accompanying this specification is shown a desirable form of apparatus which may be employed to carry out continuously my new process; but it will be understood that other forms may also be employed, as the successful carrying out of the process does not depend upon a particularly-constructed apparatus.

Figure 1 is a vertical cross-section of the apparatus, and Fig. 2 a vertical longitudinal section taken between the cylinders.

In the views the numerals 1 1 indicate two contacting metallic cylinders journaled in suitable supports and rotated by any wellknown means. The cylinders are preferably heated by steam admitted through pipes 3 3.

The milk is delivered from a reservoir 5 through a pipe 6 to a distributer 7, arranged above the cylinders. The distributer is provided with a series of tapering taps 8, fitted with adjustable conical valves 9, by means of which the quantity of milk delivered to the cylinders may be so regulated as to equal the amount drawn down in a film on the surfaces of the cylinders as they rotate, so that a limited amount of milk may be constantly boiled violently in the retaining-receptacles formed by the upper adjacent portions of the cylinders between the end pieces 10 and 10. Scrapers or knives 12 12 are provided to remove the dried film from the cylinders, and receptacles 12 12 are placed in position to receive the same.

It will be noted that the portions of the cylinder-surfaces marked A A constitute the "retaining-surface," on which the limited amount of milk is first boiled violently, and that the portions marked B B constitute the "similarly-heated surface," on which the milk is drawn in a film.

My process may be applied either to the drying of skim-milk or of whole milk, except that as there is no fat in skim-milk the alkaline hypochlorite is not needed. My process may also be applied for preserving milk-like products—for instance, the mixture of curd (wet or dry) with skim-milk rendered slightly alkaline, thus producing a highly-nitrogenous milk product in dry form with the milk constituents kept intact and digestible. This affords a desirable article of food for young animals. Farinaceous feed to adjust the food ration may be added. Cereals in the form of flour or meal can be mixed with skim or whole milk and dried by my process, giving a desirable food with the milk constituents preserved. All of these products dried and preserved by my process are stable and capable of being exported into any climate. The dry whole milk may be compressed into tablets of any suitable size—for instance, two and one-half ounces—for mixture with a pint of water.

Having thus described my invention, what I claim, and desire to protect by Letters Patent, is—

1. The herein-described process of treating milk so as to preserve it in dry form, consisting, first, in quickly concentrating the milk by violently boiling it, and, second, drawing the concentrated milk in a film onto a surface heated to a temperature in excess of 212° Fahrenheit.

2. The herein-described process of treating milk so as to preserve it in dry form, consisting, first, in violently boiling the milk in limited quantities on a surface heated to a temperature in excess of 212° Fahrenheit, and, second, drawing the milk in a film onto a surface heated in excess of 212° Fahrenheit to dry the milk, third, quickly removing the dried milk film from the latter surface while still apparently slightly moist.

3. The herein-described process of preserving milk in a dry form, consisting in, first, continuously delivering the milk onto a surface heated to a temperature in excess of 212°, but not over 270° Fahrenheit, so that a limited amount is retained thereon and violently boiled, second, withdrawing the milk, at substantially its delivery rate, in a film, onto a surface also heated to a temperature in excess of 212°, but not over 270° Fahrenheit, finally, quickly removing the dried film while still apparently slightly moist, and, last, reducing the dried film to powder.

4. The herein-described process of preserving milk in a dried form consisting in, first, adding to the milk to be dried a small amount of soluble lime salts, second, boiling the milk on a surface heated to a temperature in excess of 212°, but not over 270° Fahrenheit, third, drawing the milk therefrom in a film onto a surface also heated to a temperature in excess of 212°, but not over 270° Fahrenheit, and quickly removing the dried film of milk from that surface.

5. The herein-described process of preserving whole milk in a dry form, consisting in, first, adding to the milk small amounts of a calcium oxid dissolved in a calcium-chlorid solution, of sodium calcium citrate, and of an alkaline hypochlorite, second, violently boiling the milk on a surface heated to a temperature in excess of 212°, but not over 270° Fahrenheit, third, drawing the milk in a film onto a surface also heated to a temperature in excess of 212°, but not over 270° Fahrenheit and quickly removing the dried film.

6. The herein-described process of treating milk so as to preserve it in a dry form, consisting, first, in thoroughly mixing with a limited amount of the milk a small amount of soluble lime salts, second, adding said mixture to the entire bulk of milk to be dried, third, violently boiling the milk on a surface heated to a temperature in excess of 212°, but not over 270° Fahrenheit, fourth, drawing the milk in a film onto a surface also heated to a temperature in excess of 212°, but not over 270° Fahrenheit, and quickly scraping the dried film from the surface.

7. The herein-described process of preserving milk in a dry form, consisting in, first, adding to the milk a small amount of sodium calcium citrate, second, violently boiling the milk on a surface heated to a temperature in excess of 212°, but not over 270° Fahrenheit, third, drawing the milk in a film onto a surface also heated to a temperature in excess of 212°, but not over 270° Fahrenheit and quickly removing the dried film.

In testimony whereof I affix my signature in presence of two witnesses.

JOHN A. JUST.

Witnesses:
WILLIAM CORCORAN HILL,
SIMON S. WASHINGTON.